United States Patent [19]

Chisholm

[11] 4,359,181
[45] Nov. 16, 1982

[54] PROCESS FOR MAKING A HIGH HEAT TRANSFER SURFACE COMPOSED OF PERFORATED OR EXPANDED METAL

[76] Inventor: John Chisholm, 9337 SE. River Ter., Jupiter, Fla. 33458

[21] Appl. No.: 143,776

[22] Filed: Apr. 25, 1980

Related U.S. Application Data

[63] Continuation-in-part of Ser. No. 909,497, May 25, 1978, abandoned.

[51] Int. Cl.³ .................. B23K 31/00; B23P 11/00
[52] U.S. Cl. ........................... 228/183; 29/157.3 R; 29/163.5 R; 165/DIG. 8
[58] Field of Search .......... 228/173 R, 173 A, 173 C, 228/183, 185, 190, 178; 29/157.3 R, 163.5; 165/164, 166, 165, 167, DIG. 8, DIG. 10

[56] References Cited

U.S. PATENT DOCUMENTS

| | | | |
|---|---|---|---|
| 3,310,868 | 3/1967 | La Porte et al. | 228/183 X |
| 3,345,734 | 10/1967 | Sowko | 228/178 |
| 3,412,457 | 11/1968 | Gregory | 228/183 |
| 3,557,983 | 1/1971 | Hayes | 228/178 X |
| 3,900,629 | 8/1975 | Spencer | 29/163.5 R X |
| 3,999,699 | 12/1976 | Chisholm | 228/183 X |
| 4,124,925 | 11/1978 | Barnett | 29/163.5 R X |
| 4,130,233 | 12/1978 | Chisholm | 228/190 X |

*Primary Examiner*—John McQuade
*Assistant Examiner*—John S. Brown

[57] ABSTRACT

An improved method of making a cross-flow heat exchange surface of modified perforated or expanded metal is described. One form comprises multiple layers of the metal, stacked and laminated together by brazing. Advance in the state-of-the-art is the novel manufacturing process designed to optimize heat transfer at reduced manufacturing cost. Prior knowledge on manufacture of porous metal laminates has principally involved the weaving, layering, and bonding of wire meshes. This process obviates the need for weaving and results in a more rigid, open, low-fouling structure suitable to withstand the rigors of vigorous cleaning. The unique characteristic of this exchanger lies in the design of the lamina. A lamina comprises two expanded metal areas with a section of solid metal between. The purpose of the solid section is to provide a thermal conduction path between the two open sections. It also serves as a partition to separate the two gas streams. The expanded sections provide an effective heat exchange surface for a regenerative heat system.

3 Claims, 2 Drawing Figures

4,359,181

PROCESS FOR MAKING A HIGH HEAT TRANSFER SURFACE COMPOSED OF PERFORATED OR EXPANDED METAL

SUMMARY OF THE INVENTION

This application is a continuation-in-part of my copending application Ser. No. 909,497 filed on May 25, 1978, now abandoned.

The invention relates to applications of heat transfer in which there are special directional requirements for heat flow, for example, in cross-flow heat exchangers where it is desired to transfer heat between two well defined areas such as a pair of parallel ducts or other types of regenerative heat systems.

The improved invention of a unitary, high performance and economical fluid-to-fluid heat exchanger is described. The exchanger is a laminate composed of two types of lamina both of which are forms of expanded metal. The two types are stacked alternately from layer to layer.

One type of lamina comprises a panel of sheet metal flanked on either side by an integral expanded section. I refer to this as the "principle lamina" because it provides a continuous metal thermal path between the two expanded sections. The principle lamina is a feature of the exchanger and is made by special instruction to manufacturer of the expanded metal. It is made by holding the piercing die while the sheet metal stock advances through the press. The resulting product is a panel of expanded metal with strips of solid metal uniformly spaced between the expanded areas. The panel is then rolled flat and sheared into sections commensurate with the desired laminate dimensions.

The alternate lamina differs from the principle lamina in two respects: It comprises three separate sections; a solid metal central section and two expanded metal sections on the sides. The expanded metal is sheared from commercial type stock such that its hole pattern can be cross oriented with the opposing lamina. In this layer the thermal path between the expanded sections and the central member is made through the less thermally conductive braze material. Alternate lamina are stacked with openings cross oriented and staggered with respect to the abutting lamina to maximize fluid turbulence. Diamond shaped perforations have been found most satisfactory.

Two forms of lamina are necessary because limitations of the die press equipment prohibit expansion of the metal in the wide dimension of the diamond—a condition necessary for lamina cross orientation. In some cases the entire stack may be composed of principle lamina type layers.

In the drawings I have shown the modified expanded metal laminate at two stages of its manufacture. In these showings:

Figure 1:
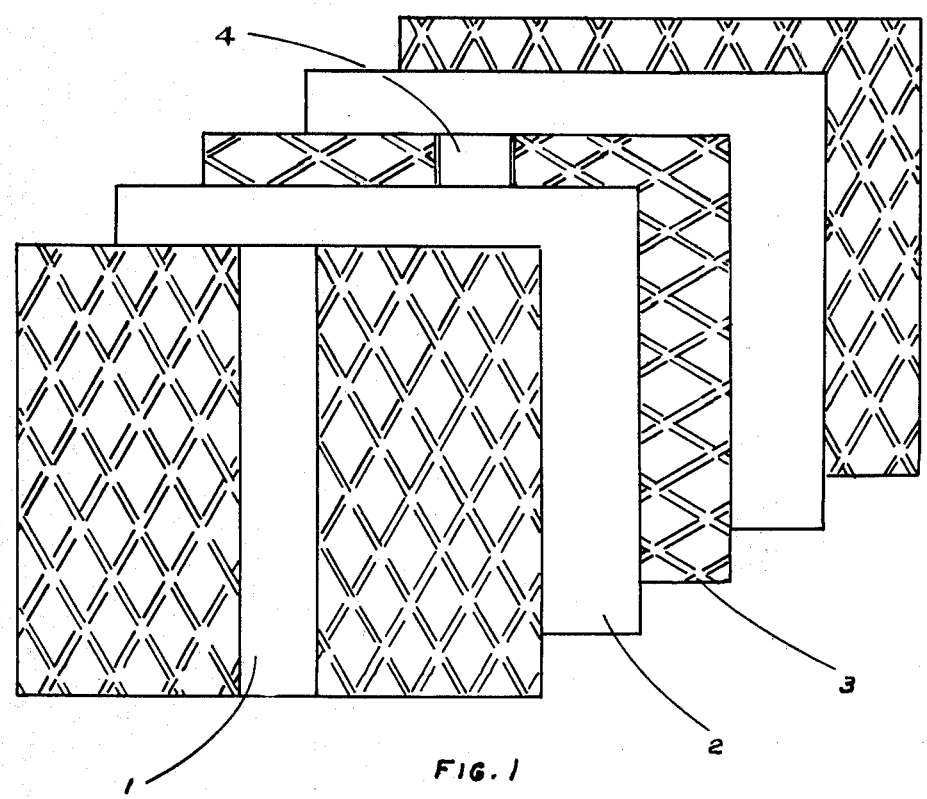
FIG. 1 is a fragmentary and exploded isometric sketch showing the various layers of the laminate before brazing.

FIG. 1 depicts an exploded view of one form of the modified expanded metal laminate. Part 1 is the principle lamina; Part 2 is the braze metal; Part 3 is the conventional expanded metal filler, cross-oriented to the abutting lamina; Part 4 is the solid metal filler.

Figure 2:
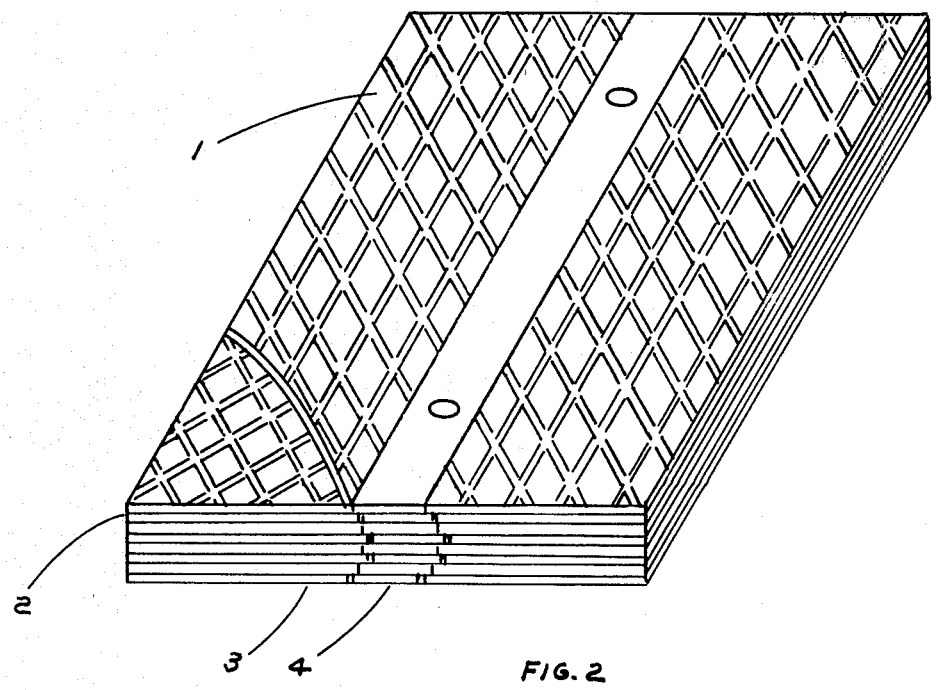
FIG. 2 is a fragmentary isometric sketch showing the brazed laminate with holes in the solid section for the reception of rods.

FIG. 2 depicts another form of the modified expanded metal laminate in which there are holes in the solid section for the reception of rods used to assemble multiple laminates each of which comprises relatively few layers. The intent of this design is to accomplish ease of cleaning the matrix surfaces. Part 1 is the principle lamina; Part 2 is the braze metal; Part 3 is the conventional expanded metal filler cross-oriented to the abutting lamina; Part 4 is the solid metal filler with through holes.

The braze material may be in sheet form. Capillarity and metal wetting will suck up the excess braze leaving the fluid passages open.

The invention is the improved process of making a low cost, laminated, fluid-to-fluid heat exchanger including an innovative detail of its principle lamina whose thermal conduction path is completely integral with its heat transfer surface. The laminated metal exchanger is a unique departure from conventional design and susceptible to very difficult production techniques.

The preferred method for manufacturing this heat exchanger is first, to proportion the relative size of open and solid sections of the heat exchange surface; these proportions are a function of the particular heat transfer requirement.

Expanded metal is not presently marketed in the desired form. Accordingly, it is necessary to arrange for a special run from an expanding press. The resulting modified mesh must then be flattened in a rolling mill.

Next the expanded metals is cut into panels comprising a solid section flanked by two open sections. The panels are cleaned by vapor degreasing.

Following the degreasing-aluminum parts and brazing material are dipped in a hot alkaline solution to remove possible smuts. A solution of Oakite 61A at 170° F. (6 oz/gal) in tap water is often used. Parts must then be rinsed thoroughly in hot running water to remove all traces of the cleaner.

Next, deoxidizing is done by immersing the aluminum and brazing metal in a solution of Oakite 84A and deionized water (10 oz/gal) at room temperature. Time in the solution is limited to about six minutes. Parts are then removed, air dried, and placed in a plastic bag until time of brazing. Storage time should not exceed eight hours.

Parts to be brazed by the flux-dip process are jigged with the braze metal in position and fluxed before final clamping. Parts are then placed in a pre-heat oven (approximately 1000° F.) until they come up to temperature. The jigged assembly is then placed in a molten salt bath. Immersion time is very short (minutes) and depends on the mass of the assembly. The temperature of the bath must match the alloy being brazed; it must be high enough to bring the filler metal to liquidus without bringing the parent metal past the solidus state. Care must be exercised to minimize webbing the braze metal in the tortuous passages of the laminate.

After brazing, the submerged assembly is raised a short distance above the molten flux and held there until it cools to about 900° F. This is done to ensure adequate flux drainage.

Parts are then removed from the pot and while still hot are placed in boiling water to remove residual flux. Further cleaning, if necessary, may be accomplished by placing the parts in an ultrasonic cleaner with hot water. In difficult cases nitric acid (50/50 by volume with water) is an effective solution for flux removal. This is followed by further hot water rinse.

Other methods of brazing are equally effective but are used to a lesser degree at this stage of the aluminum brazing art. Notably is controlled atmosphere brazing (as described in U.S. Pat. No. 4,130,233) which has the advantage of being a "no-flux" process.

While the embodiments of this invention as disclosed constitute the most obvious forms, it will be apparent to those skilled in the art of heat transfer that the invention is applicable to either heating or cooling conditions both falling within the scope of the claims which follow.

I claim:

1. A method for making a unitary, fluid to fluid heat exchanger of laminated expanded metal whose two types of lamina are alternately stacked with their expanded metal areas above each other and oriented at 90° and staggered with respect to abutting lamina; said two types of lamina comprising a unique principle lamina having a solid metal central strip integral with other areas which have been converted to expanded metal and alternate lamina composed of three separate members including a central solid metal section and two separate expanded metal sections; said method comprising placing brazing material between flattened lamina, brazing the assembly by conventional methods, and removing flux from the brazed assembly.

2. The method recited in claim 1 including providing two or more through holes in the solid sections for the reception of rods whose purpose is to group those heat exchangers characterized by relatively few layers of laminate.

3. The steps recited in claim 1 wherein all lamina are of the principle lamina type.

* * * * *

UNITED STATES PATENT AND TRADEMARK OFFICE
CERTIFICATE OF CORRECTION

PATENT NO. : 4,359,181
DATED : November 16, 1982
INVENTOR(S) : John Chisholm

It is certified that error appears in the above-identified patent and that said Letters Patent is hereby corrected as shown below:

Column 2, line 20, "difficult" should read --efficient--.
Column 2, line 30, "metals" should read --metal--.

Signed and Sealed this

Fifth Day of April 1983

[SEAL]

Attest:

GERALD J. MOSSINGHOFF

Attesting Officer    Commissioner of Patents and Trademarks